US012803481B2

(12) United States Patent
Zhang

(10) Patent No.: US 12,803,481 B2
(45) Date of Patent: Nov. 17, 2026

(54) MOTOR CONTROL

(71) Applicant: Cypress Semiconductor Corporation, San Jose, CA (US)

(72) Inventor: Na Zhang, Beijing (CN)

(73) Assignee: Infineon Technologies Americas Corp., El Segundo, CA (US)

( * ) Notice: Subject to any disclaimer, the term of this patent is extended or adjusted under 35 U.S.C. 154(b) by 217 days.

(21) Appl. No.: 18/666,674

(22) Filed: May 16, 2024

(65) Prior Publication Data

US 2025/0357879 A1 Nov. 20, 2025

(51) Int. Cl.

*H02P 23/30* (2016.01)
*H02P 21/18* (2016.01)
*H02P 21/34* (2016.01)
*H02P 25/03* (2016.01)

(52) U.S. Cl.

CPC .............. *H02P 23/30* (2016.02); *H02P 21/18* (2016.02); *H02P 21/34* (2016.02); *H02P 25/03* (2016.02)

(58) Field of Classification Search

CPC .......... H02P 23/30; H02P 21/18; H02P 21/34; H02P 25/03; H02P 21/14; H02P 6/08; H02P 6/28; H02P 21/22

USPC ........................................ 318/700, 599, 560

See application file for complete search history.

(56) References Cited

U.S. PATENT DOCUMENTS

| | | | | |
|---|---|---|---|---|
| 6,281,659 | B1 * | 8/2001 | Giuseppe | H02P 21/16 318/807 |
| 11,146,205 | B2 * | 10/2021 | Spampinato | H02P 29/032 |
| 11,418,140 | B2 * | 8/2022 | Tang | H02P 21/141 |
| 11,560,172 | B2 * | 1/2023 | Sugiyama | H02P 25/22 |

* cited by examiner

*Primary Examiner* — David Luo

(57) ABSTRACT

According to some embodiments, a method for controlling a motor includes applying a first reference torque generating current parameter during a start-up mode to a motor in a stationary state, generating a demand torque generating voltage parameter based on the first reference torque generating current parameter, determining a feedback torque generating current parameter based on measured motor current in the stationary state, determining a phase resistance measurement of the motor based on the demand torque generating voltage parameter and the feedback torque generating current parameter, and controlling the motor in a speed control mode based on the phase resistance measurement.

16 Claims, 5 Drawing Sheets

MOTOR CONTROL

TECHNICAL FIELD

The present disclosure relates generally to motor control.

BACKGROUND

Permanent Magnet Synchronous Motors (PMSMs) are employed in consumer and industrial motor applications due to their higher reliability and smaller size compared to other types of motors. To achieve high efficiency and low vibration and acoustic noise, Field-Oriented Control (FOC) techniques are often used in consumer and industrial PMSM control for fans, pumps, compressors, geared motors, and the like.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

According to some embodiments, a method for controlling a motor comprises applying a first reference torque generating current parameter during a start-up mode to a motor in a stationary state, generating a demand torque generating voltage parameter based on the first reference torque generating current parameter, determining a feedback torque generating current parameter based on measured motor current in the stationary state, determining a phase resistance measurement of the motor based on the demand torque generating voltage parameter and the feedback torque generating current parameter, and controlling the motor in a speed control mode based on the phase resistance measurement.

According to some embodiments, a motor controller comprises a first controller configured to apply, in a start-up mode, a first reference torque generating current parameter to a motor in a stationary state, a second controller configured to generate a demand torque generating voltage parameter based on the first reference torque generating current parameter during the start-up mode, and a feedback unit configured to receive a three-phase motor current measurement responsive to the demand torque generating voltage parameter and transform the three-phase motor current measurement to determine a feedback torque generating current parameter, wherein the first controller is configured to determine a phase resistance measurement of the motor based on the demand torque generating voltage parameter and the feedback torque generating current parameter, and the second controller is configured to control the motor in a speed control mode based on the phase resistance measurement.

According to some embodiments, a system comprises a motor, a current sense unit connected to the motor and configured to measure a motor current and generate a motor current measurement, and a motor controller, comprising a first controller configured to apply, in a start-up mode, a first reference torque generating current parameter to the motor, a second controller configured to generate a demand torque generating voltage parameter based on the first reference torque generating current parameter during the start-up mode, and a feedback unit configured to receive the motor current measurement responsive to the demand torque generating voltage parameter and transform the motor current measurement to generate a feedback torque generating current parameter, wherein the motor is stationary during the start-up mode, the first controller is configured to determine a phase resistance measurement of the motor based on the demand torque generating voltage parameter and the feedback torque generating current parameter, and the second controller is configured to control the motor in a speed control mode based on the phase resistance measurement.

According to some embodiments, a system for controlling a motor comprises means for applying a first reference torque generating current parameter during a start-up mode to a motor in a stationary state, means for generating a demand torque generating voltage parameter based on the first reference torque generating current parameter, means for determining a feedback torque generating current parameter based on measured motor current in the stationary state, means for determining a phase resistance measurement of the motor based on the demand torque generating voltage parameter and the feedback torque generating current parameter, and means for controlling the motor in a speed control mode based on the phase resistance measurement.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
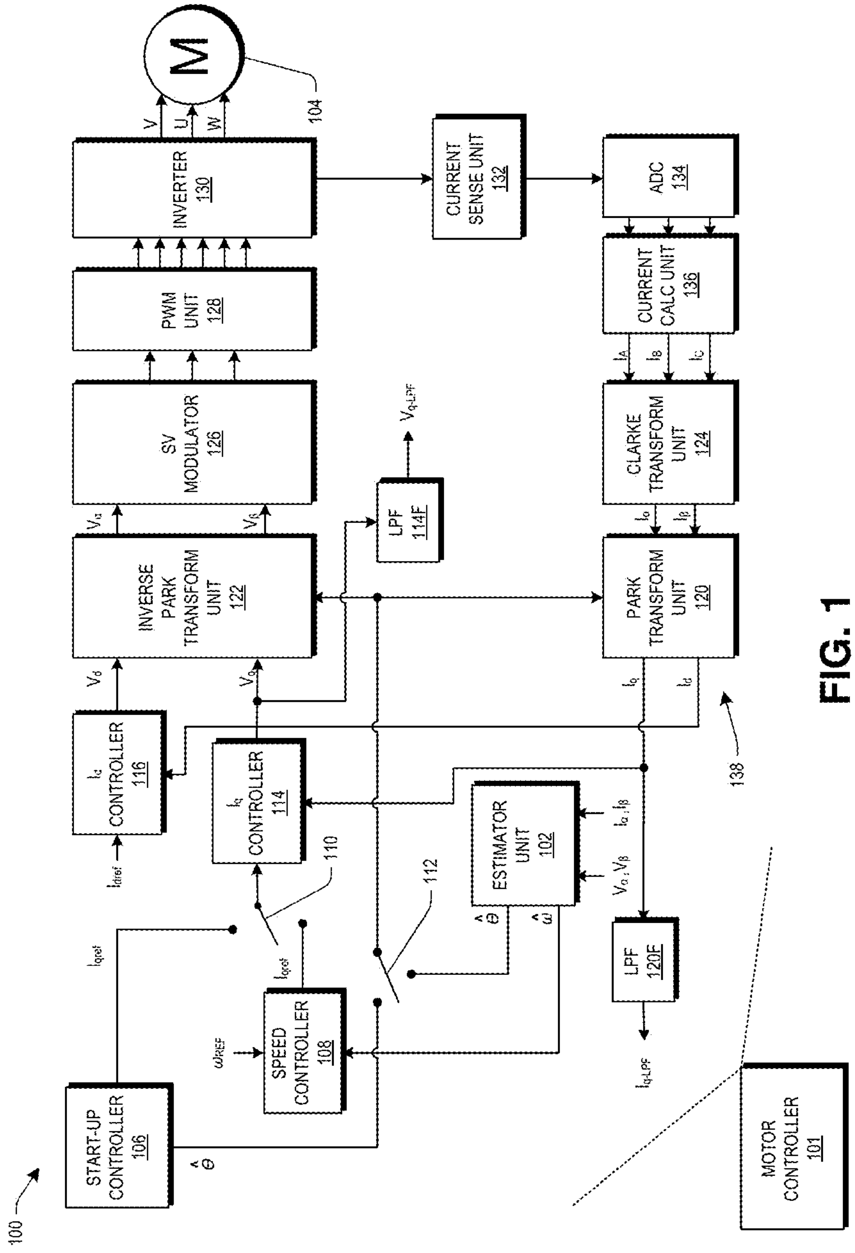
FIG. 1 is a schematic diagram of a motor controller, in accordance with some embodiments.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

In addition to motor control functions, the processing time of a microcontroller used in a motor controller is also shared to provide user interfaces and other functionality. Providing motor control without computationally intensive techniques, such as transforms requiring quadric equations, allows increased functionality to be provided in systems with reduced complexity, lower cost microcontrollers.

Field-Oriented Control (FOC) is a method of variable speed control for three-phase alternating current (AC) electric motors to improve power efficiency with fast control response over a full range of motor speeds. Various implementations of structures, components, and techniques for providing control of three-phase AC motors are discussed herein. Structures, components, and techniques are discussed with reference to example three-phase Permanent Magnet Synchronous Motor (PMSM) devices and control systems. However, this application is not intended to be limiting, and is for ease of discussion and illustrative convenience. The techniques and devices discussed may be applied to other motor designs, control structures, and the like (e.g., single-phase and three-phase variable frequency drives, digital phase converters, three-phase and single-phase motors, induction motors, regenerative drives, etc.), and remain within the scope of the disclosure.

FIG. 1 is a schematic diagram of a motor system 100, according to some embodiments. The motor system 100 comprises a motor controller 101 employing a sensorless topology that uses an estimator unit 102 to estimate a rotor position, $\hat{\theta}$, and a rotor speed, $\hat{\omega}$, to support FOC techniques for controlling a motor 104. In some embodiments, the motor controller 101 estimates a motor resistance parameter, $R_s$, for use in controlling the motor 104.

Rotor speed is indicative of motor speed. To implement FOC control, the motor controller 101 uses a Park transform and an Inverse Park Transform to convert between a D-Q rotor fixed reference frame defined by a torque generating component, Q, and a flux generating component, D, and an a-β stationary reference frame.

The Park Transform converts orthogonal stationary reference frame currents to flux generating and torque generating currents using the equations:

$$I_d = I_\alpha * \cos(\theta) + I_\beta * \sin(\theta) \text{ and}$$

$$I_q = I_\beta * \cos(\theta) - I_\alpha * \sin(\theta).$$

The Inverse Park Transform converts rotating reference frame back to the stationary reference frame using the equations:

$$V_\alpha = V_d * \cos(\theta) - V_q * \sin(\theta) \text{ and}$$

$$V_\beta = V_q * \cos(\theta) + V_d * \sin(\theta).$$

A Clarke transform to convert between a three-phase reference frame defined by V, U, and W components and the a-B stationary reference frame using the equations:

$$I_\alpha = \frac{2}{3}(I_a) - \frac{1}{3}(I_b + I_c) \text{ and}$$

$$I_\beta = \frac{1}{\sqrt{3}}(I_a + 2 * I_b).$$

Figure 2:
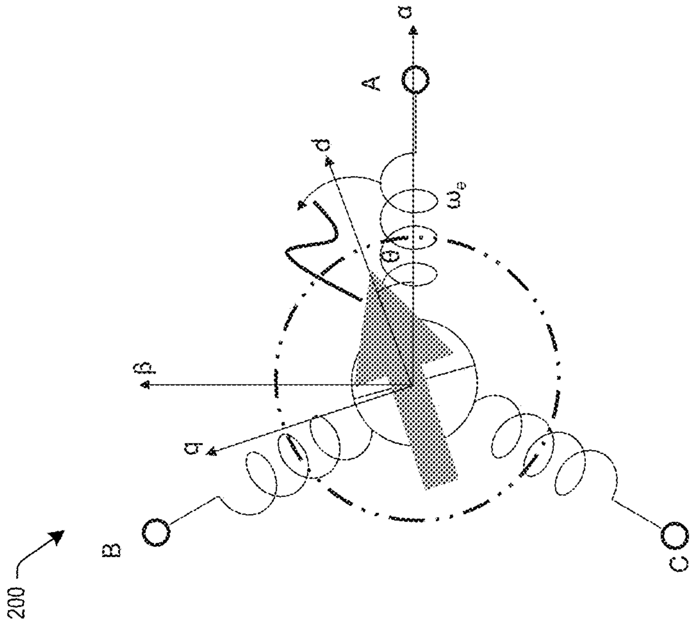
FIG. 2 is a diagram illustrating a permanent magnet synchronous motor (PMSM) rotating orthogonal coordinate system, in accordance with some embodiments.

FIG. 2 is a diagram 200 illustrating a PMSM rotating orthogonal coordinate system, in accordance with some embodiments. The a-B stationary reference frame signals are sinusoidal signals at steady state, and the D-Q rotor fixed reference frame signals are nearly constant at steady state. In the three-phase reference frame, the A, B, and C components are separated by 120° and are stationary. In the a-B stationary reference frame, the components are electrically orthogonal and stationary. In the D-Q rotor fixed reference frame, the components are electrically orthogonal and rotating. For purposes of this description it is assumed that the motor 104 rotates in a positive direction, i.e., the counter-clockwise direction, so the angles and angular speeds are positive numbers. The signs of the angles and angular speeds may be changed for a motor 104 that rotates in the negative direction, i.e., the clockwise direction. Coordinate systems may be referenced to the stator and/or the rotor of the motor 104. For example, the D-Q rotor fixed reference frame is fixed to the rotor and the components of the D-Q coordinate system rotate together. The direct axis of the D-Q rotor fixed reference frame is oriented in the direction from the rotor permanent magnet south pole(S) to north pole (N). The quadrature axis of the D-Q rotor fixed reference frame is perpendicular to the rotor flux (e.g., to the rotor).

The three-phase sinusoidal currents $I_A$, $I_B$, and $I_C$ of the motor stator windings are separated by 120° and generate three non-rotating, pulsating magnetic fields in the A, B, and C directions, respectively, resulting in a rotating magnetic field (stator flux space vector). Vector addition of $I_A$, $I_B$, and $I_C$ gives a current space vector. The magnitude of the current space vector may be scaled up or down with no change of direction for a motor rotating at speed, $\omega_i$.

In the stationary α-β reference frame, the rotating stator flux space vector represents the rotating stator magnetic flux. Vector addition of the three-phase 120° separated stator phase voltages $V_A$, $V_B$, and $V_C$ defines a rotating voltage space vector. A rotating rotor permanent magnet generates a rotating rotor magnetic flux space vector. The magnitudes and directions of the above-mentioned rotating space vectors can be represented by radial coordinates and polar angles in polar coordinate systems. Techniques for transforming between the reference frames are known in the art.

Referring to FIG. 1, the motor controller 101 comprises a start-up controller 106 that provides open loop parameters during a start-up mode of the motor 104 and a speed controller 108 provides closed loop control during a speed control mode of the motor 104. The start-up controller 106 controls switches 110, 112 to select between start-up mode and speed control mode operation. The switch 110 selects between the start-up controller 106 and the speed controller 108 to provide an $I_{qref}$ signal. The switch 112 selects between the start-up controller 106 and the output of the estimator unit 102 to provide an estimated rotor position, $\hat{\theta}$.

During speed control mode, the speed controller 108 receives a reference speed, $\omega_{ref}$, representing a desired rotational speed for the motor 104 and an estimated rotor speed, $\hat{\omega}$, from the estimator unit 102 as inputs. In some embodiments, the speed controller 108 is a proportional-integral (PI) controller that operates to drive the error between the inputs to zero. An $I_q$ controller 114 receives the $I_{qref}$ signal from the switch 110 and a feedback torque generating current parameter ($I_q$). In some embodiments, the $I_q$ controller 114 is a proportional-integral (PI) controller that operates to drive the error between its inputs to zero. An $I_d$ controller 116 receives a reference flux generating current parameter ($I_{dref}$) and a feedback flux generating current parameter ($I_d$) as inputs. In some embodiments, the $I_d$ controller 116 is a proportional-integral (PI) controller that operates to drive the error between its inputs to zero. The $I_q$ controller 114 outputs a demand torque generating voltage parameter, $V_q$, and the $I_d$ controller 116 outputs a demand flux generating voltage parameter, $V_d$. The flux generating component $I_d$ is controlled to zero by providing an $I_{dref}$ value of zero. The flux generating component $I_d$ may be controlled using a negative $I_{dref}$ value to implement flux-weakening control to extend the operating speed range of the motor 104 or using a positive an $I_{dref}$ value to implement flux-boosting control.

The motor controller 101 comprises a Park transform unit 120, an inverse Park transform unit 122, and a Clarke transform unit 124 to convert between reference frames. The Park transform unit 120 transforms the a-β stationary reference frame to the D-Q rotor fixed reference frame. The inverse Park transform unit 122 transforms the D-Q rotor fixed reference frame to the a-β stationary reference frame. The Clarke transform unit 124 transforms the three-phase reference frame to the a-B stationary reference frame.

The inverse Park transform unit 122 receives the demand torque generating voltage parameter, $V_q$, from the $I_q$ controller 114 and the demand flux generating voltage parameter, $V_d$, from the $I_d$ controller 116 and generates stationary frame voltage parameters, $V_\alpha$, $V_\beta$, as inputs to a space vector modulator 126. The amplitude and angle of the voltage vector defined by $V_\alpha$ and $V_\beta$ provide a reference voltage for the space vector modulator 126 for controlling a pulse width modulation (PWM) unit 128 to generate three-phase sinusoidal waveform output signals to drive an inverter 130. The output signals of the inverter 130 drive the phases of the motor 104. In some embodiments, the inverter 130 comprises a three-phase two-level voltage inverter.

A current sense unit 132 senses phase currents of the motor 104. In some embodiments, the current sense unit 132 comprises three shunt resistors associated with the three legs of the inverter 130 to sense the current of each phase of the motor 104. In some embodiments, two shunt resistors are used to sense the current of two phases of the motor 104. The current from the third phase of the motor 104 may be calculated based on the relationship $I_A+I_B+I_C=0$. In some embodiments, a single shunt resistor is inserted into to a DC link of the inverter 130 to sense a DC link current, and a three-phase current reconstruction is used to obtain the current information for each phase of the motor 104.

An analog-to-digital converter (ADC) 134 receives the sensed voltages from the current sense unit 132 to generate digital inputs for a current calculation unit 136. The current calculation unit 136 generates phase current measurement parameters, $I_A$, $I_B$, and $I_C$. The phase current measurement parameters are provided to the Clarke transform unit 124 to generate a-B stationary reference frame feedback current parameters, $I_\alpha$, $I_\beta$. The stationary reference frame feedback current parameters are provided to the Park transform unit 120 to generate a feedback torque generating current parameter, $I_q$, and a feedback flux generating current parameter, $I_d$. The current calculation unit 136, Clarke transform unit 124, and Park transform unit 120 comprise a feedback unit 138 for generating the feedback torque generating current parameter, $I_q$, and the feedback flux generating current parameter, $I_d$.

The estimator unit 102 estimates the rotor position, $\hat{\theta}$, and the rotor speed, $\hat{\omega}$, using data in the α-β stationary reference frame. In a Surface Permanent Magnet Synchronous Motor (SPMSM) efficiency is increased by controlling the flux generating current, $I_d$, to zero.

The dynamic D-Q axis voltage equations for a PMSM are:

$$V_d = R_s I_d - \omega_e L_q I_q + L_d \frac{dI_d}{dt} \text{ and} \tag{1}$$

-continued $$V_q = R_s I_q + \omega_e L_d I_d + L_q \frac{dI_q}{dt} + \omega_e k_e, \tag{2}$$

where:

$V_d$—Flux generating voltage $V_q$—Torque generating voltage $R_s$—Motor phase resistance $L_d$—Synchronous inductance of motor winding in d-axis $L_q$—Synchronous inductance of motor winding in q-axis $I_q$—Torque generating current $I_d$—Flux generating current $k_e$—Back EMF constant In some embodiments, the start-up controller 106 estimates the motor phase resistance, $R_s$, during the start-up mode. In some embodiments, the synchronous inductance parameters, $L_q$ and $L_d$, are motor specification sheet reference values.

Figure 3:
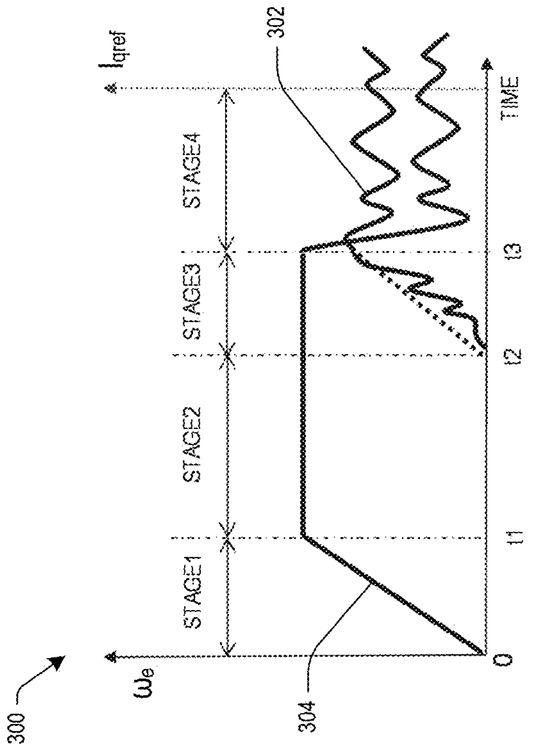
FIG. 3 is a diagram illustrating a start-up mode of a motor, in accordance with some embodiments.

FIG. 3 is a diagram 300 illustrating a start-up mode of the motor 104, in accordance with some embodiments. The start-up mode is controlled by the start-up controller 106. During start-up, the switches 110, 112 are connected to the start-up controller 106. During speed control mode, the switch 110 is connected to the speed controller 108 and the switch 112 is connected to the estimator unit 102.

The start-up controller 106 generates the reference torque generating current, $I_{qref}$, and a reference rotor position, $\hat{\theta}$. The reference torque generating current, $I_{qref}$, from the start-up controller 106 is provided by the switch 110 to the $I_q$ controller 114. The output of the $I_q$ controller 114 is provided to a low pass filter 114F to generate $V_{q-LPF}$. The reference rotor position, $\hat{\theta}$, from the start-up controller 106 is provided by the switch 112 to the Park transform unit 120 and the inverse a Park transform unit 122. Motor current generated in response to the reference torque generating current, $I_{qref}$, from the start-up controller 106 is sensed by the current sense unit 132, converted to digital values by the ADC 134, converted to phase currents by the current calculation unit 136, converted to stationary reference frame currents by the Clarke transform unit 124, and converted to D-Q rotor fixed reference frame currents by the Park transform unit 120. The $I_q$ output of the Park transform unit 120 is provided to a low pass filter 120F to generate $I_{q-LPF}$.

In FIG. 3, the electric speed $\omega_e$, is shown by curve 302, and the reference torque generating current, $I_{qref}$, is shown by curve 304. Stage 1 is an orientation stage. In stage 1, the start-up controller 106 sets an initial electrical angle setpoint of 90 degrees and applies a current $I_{qref}$ in a ramp to move the motor 104 to the setpoint for the rotor position, $\hat{\theta}$. Stage 2 is a stabilizing stage where the motor 104 is not moving ($\omega_e=0$) and the start-up controller 106 provides a steady-state value of $I_{qref}$ after the initial electric angle of the motor 104 is achieved. Stage 3 is an asynchronous driving stage to begin rotating the motor, as seen by an increase in the electric speed ($\omega_e$). In stage 4, speed control mode operation commences by configuring the switch 110 to select the speed controller 108 and configuring the switch 112 to select the estimator unit 102.

In some embodiments, the start-up controller 106 measures the phase resistance, $R_s$, in stage 2 where the motor 104 is stationary. Because the electric speed (we) is zero, the back EMF is zero. The current measured by the current sense unit 132 is the steady-state current. The output voltages of the $I_d$ controller 116 and the $I_q$ controller 114 are square wave signals with high-frequency alternating current, leading to ripple in the phase current so the current derivatives are not zero. The low pass filters 114F, 120F remove the ripple to provide $V_{q-LPF}$ and $I_{q-LPF}$. If the feedback flux generating current, $I_d$, from the Park transform unit 120 were to be provided to a low pass filter, it would have a zero value. Hence, since $\omega_e$=0, $$I_{d-LPF}=0,\ ,\ \frac{d}{dt}I_{d-LPF}=0,\ \text{and}\ \frac{d}{dt}I_{q-LPF}=0$$

equations 1 and 2 can be simplified as:

$$V_d = 0 \text{ and} \quad (3)$$

$$V_{q-LPF} = R_s I_{q-LPF} \quad (4)$$

The phase resistance from equation 4 is:

$$R_s = \frac{V_{q-LPF}}{I_{q-LPF}}. \quad (5)$$

In some embodiments, the start-up controller 106 takes multiple resistance measurements during stage 2 and averages the results. In some embodiments, the motor controller 101 controls the motor 104 based on the measured phase resistance, $R_s$. The integral gain parameter for the current loops controlled by the $I_q$ controller 114 and the $I_d$ controller 116 may be set depending on the measured phase resistance, $R_s$, according to:

$$K_I = \omega_c R_s \quad (6)$$

The transfer function of the current control loop is a first order LPF with a cutoff frequency of $\omega_c$. In some embodiments, the cutoff frequency, $\omega_c$, is set at approximately three times of the maximum electrical motor speed to obtain a good tradeoff between dynamic response and sensitivity to measurement noise. The motor controller 101 sets the integral gain parameter for the $I_q$ controller 114 or the $I_d$ controller 116 based on the measured phase resistance, $R_s$.

Figure 4:
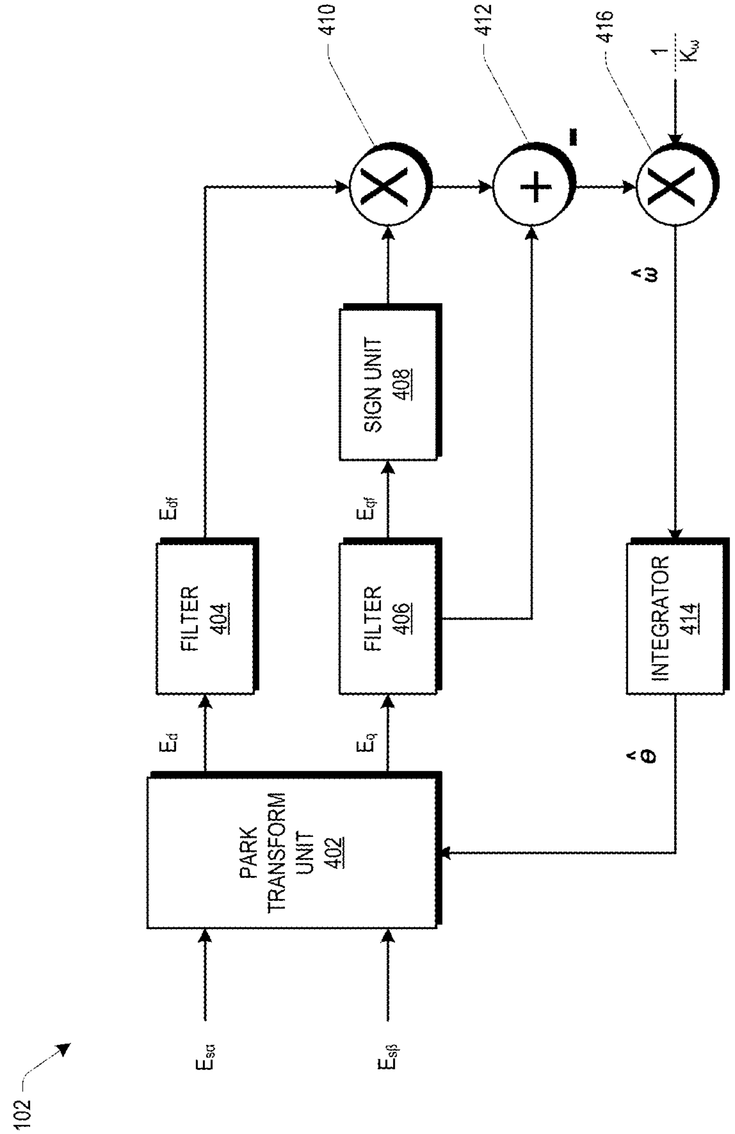
FIG. 4 is a schematic diagram of an embodiment of an estimator unit, in accordance with some embodiments.

FIG. 4 is a schematic diagram of an embodiment of the estimator unit 102, according to some embodiments. In some embodiments, the estimator unit 102 is a sliding mode estimator that uses motor parameters, such as a-β reference frame current, $I_\alpha$ and $I_\beta$, α-β reference frame voltage, $V_\alpha$ and $V_\beta$, measured phase resistance, $R_s$, and the synchronous inductance parameters, $L_q$ and $L_d$, to estimate motor speed and position. The estimator unit 102 determines stator back EMF parameters based on the α-β reference frame voltage and current based on:

$$E_{s\alpha} = V_\alpha - R_s I_\alpha - L_s\frac{dI_\alpha}{dt},\ \text{and}$$

$$E_{s\beta} = V_\beta - R_s I_\beta - L_s\frac{dI_\beta}{dt},$$

where $L_s$ is the stator inductance parameter that equals the synchronous inductance parameters ($L_s=L_q=L_d$) for a surface mounted PMSM and equals the average of the synchronous inductance parameters ($L_s=\frac{1}{2}(L_q+L_d)$) for an interior mounted PMSM.

In some embodiments, the estimator unit 102 comprises a Park transform unit 402, filters 404, 406 connected to the Park transform unit 402, a sign unit 408 connected to the filter 406, a multiplication unit 410 connected to the filter 404 and the sign unit 408, a subtraction unit 412 connected to the filter 406 and the multiplication unit 410, an integrator 414 connected to the Park transform unit 402, and a multiplication unit 416 connected to the subtraction unit 412 and the integrator 414. The outputs of the Park transform unit 402 are D-Q frame back EMF parameters:

$$E_d = E_\alpha * \cos(\theta) + E_\beta * \sin(\theta) \text{ and}$$

$$E_q = E_\beta * \cos(\theta) - E_\alpha * \sin(\theta).$$

In some embodiments, the filters 404 and 406 are low pass filters that generate filtered D-Q frame back EMF parameters, $E_{df}$ and $E_{qf}$. The sign unit 408 determines the sign (+/−) of the filtered Q back EMF parameter, $E_{qf}$. The sign unit 408, the multiplication units 410, 416, and the subtraction unit 412 generate an estimated speed according to:

$$\hat{\omega} = \frac{1}{K\varphi}(E_{qf} - \text{sign}(E_{qf}) * E_{df}).$$

The integrator 414 estimates the rotor position based on the estimated rotor speed:

$$\hat{\theta} = \int \hat{\omega}\,dt.$$

In some embodiments, different update frequencies are used for different loops in the motor controller 101. For example, the speed controller 108 updates at intervals, such as 1 ms, 2 ms, 5 ms, etc. The $I_d$ controller 116, the $I_q$ controller 114, the estimator unit 102, and the low pass filters 114F, 120F operate at a high frequency update frequency, such as 4 KHz, 8 KHz, 16 KHz, etc.

Figure 5:
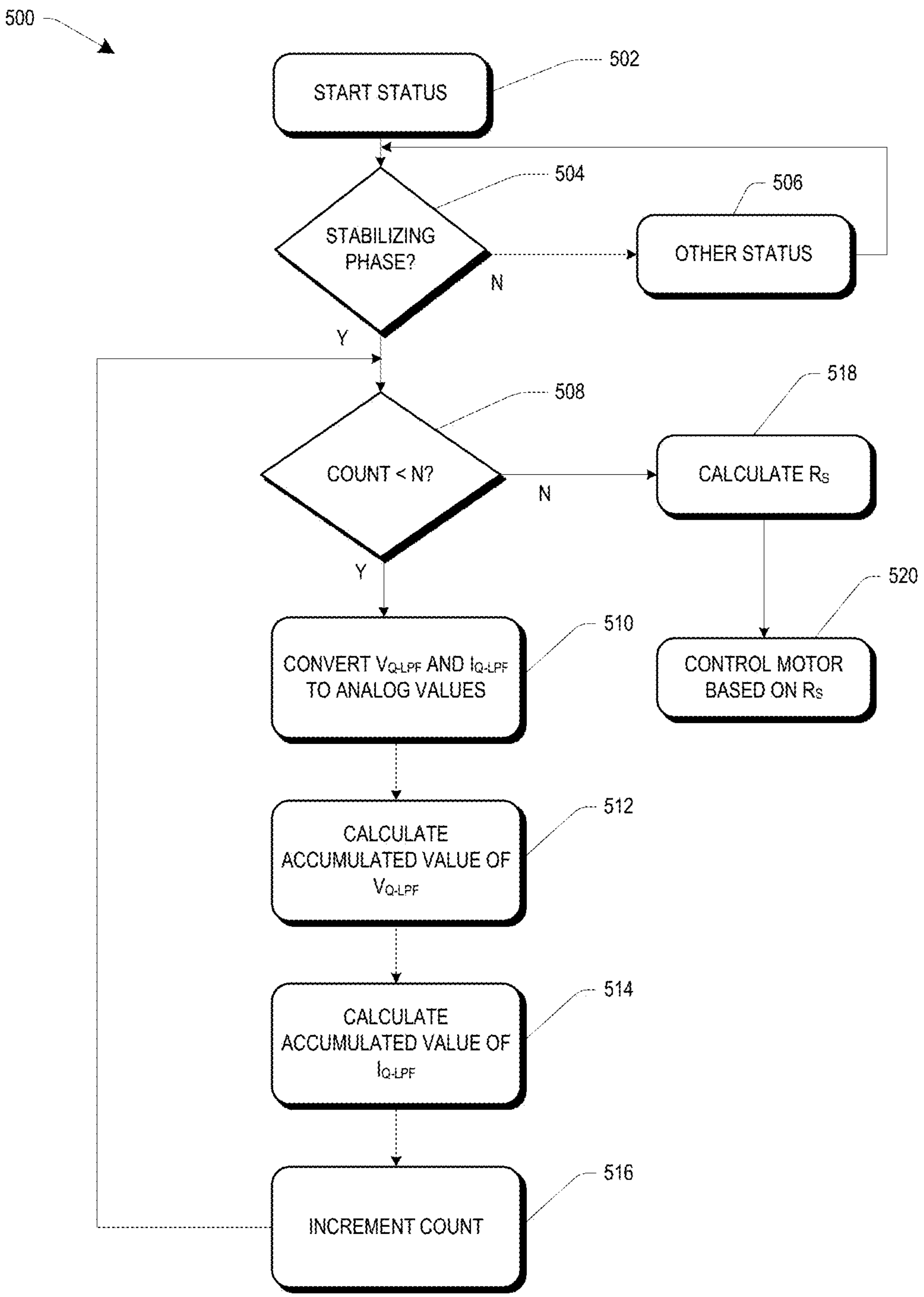
FIG. 5 illustrates a method of controlling a motor, in accordance with some embodiments.

FIG. 5 illustrates a method 500 of controlling the motor 104, in accordance with some embodiments. At 502, the motor 104 enters a start status, for example stages 1-3 in FIG. 3. At 504, the start-up controller 106 determines if the motor 104 is in the stabilizing phase, for example, stage 2 in FIG. 3. The start-up controller 106 implements a loop in the stabilizing phase to record N measurements of the phase resistance, $R_s$. The loop count, N, map be reset at 502. If the loop count is less than N at 508, at 510 the start-up controller 106 converts the digital values of $V_{q-lpf}$ and $I_{q-lpf}$ from the low pass filters 114F, 120F, respectively, to analog values. The conversion operates in reverse to the operation of the ADC 134 that converts analog values to digital values and depends on the dynamic range used for the digital values. At 512, the start-up controller 106 calculates the accumulated value of $V_{q-lpf}$ and at 514, the start-up controller 106 calculates the accumulated value of $I_{q-lpf}$. In some embodiments, the accumulated values represent average values. In some embodiments, the accumulated values are vectors of the values. The loop count is incremented at 516.

If the count is reached at 508, the start-up controller 106 calculates the phase resistance, $R_s$, at 518. At 520, the motor controller 101 controls the motor 104 based on the measured phase resistance, $R_s$. In some embodiments, controlling the motor 104 may include setting the integral gain parameter of the current loops controlled by the $I_q$ controller 114 or the $I_d$ controller 116 as set forth in Equation 6 for generating drive signals for the motor 104. In some embodiments, controlling the motor 104 may include estimating the rotor speed and position based on the measured phase resistance, $R_s$, as illustrated in FIG. 4, and providing the estimates to the speed controller 108 for controlling the $I_q$ controller 114.

Furthermore, some of the disclosed techniques may be readily implemented in software using object or object-oriented software development environments that provide portable source code that can be used on a variety of computer or workstation platforms. Alternatively, the disclosed techniques and/or arrangements may be implemented partially or fully in hardware using standard logic circuits or VLSI design. In some embodiments, the motor 104, the inverter 130, current sense unit 132, and the ADC 134 are hardware-implemented and the remaining units in FIG. 1 are software implemented. However, other combinations of hardware, firmware, or software are contemplated.

Moreover, the disclosed procedures may be readily implemented in software that can be stored on a computer-readable storage medium (such as a memory storage device), executed on programmed general-purpose computer with the cooperation of a controller and memory, a special purpose computer, a microprocessor, or the like. In these instances, the arrangements and procedures of the described implementations may be implemented as program embedded on personal computer such as an applet, JAVA® or CGI script, as a resource residing on a server or computer workstation, as a routine embedded in a dedicated communication arrangement or arrangement component, or the like. The arrangements may also be implemented by physically incorporating the arrangements and/or procedures into a software and/or hardware system, such as the hardware and software systems of a test/modeling device.

Figure 6:
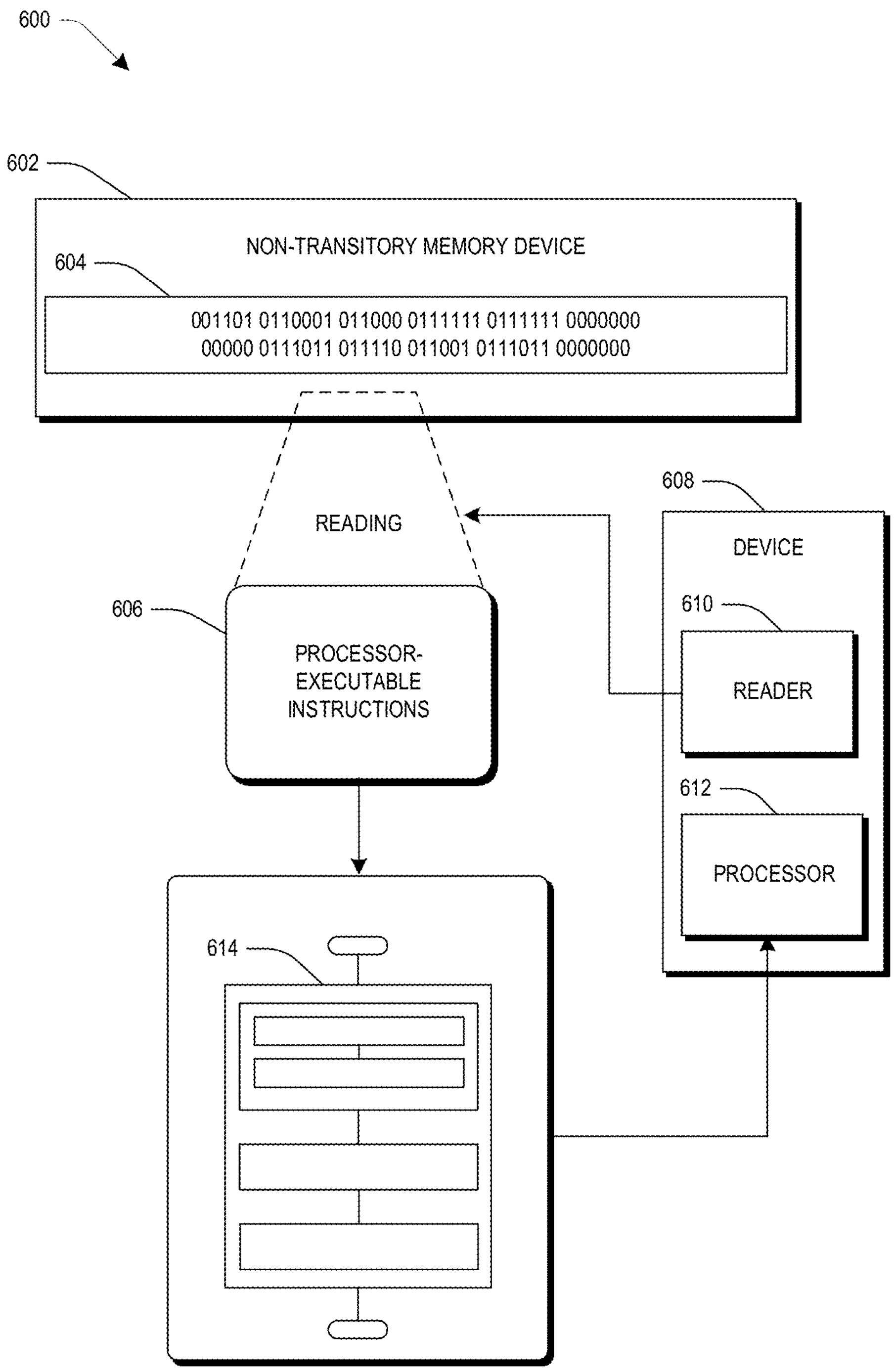
FIG. 6 illustrates an exemplary computer-readable medium, in accordance with some embodiments.

FIG. 6 illustrates an exemplary embodiment 600 of a computer-readable medium 602, according to some embodiments. One or more embodiments involve a computer-readable medium comprising processor-executable instructions configured to implement one or more of the techniques presented herein. The embodiment 600 comprises a non-transitory computer-readable medium 602 (e.g., a CD-R, DVD-R, flash drive, a platter of a hard disk drive, etc.), on which is encoded computer-readable data 604. This computer-readable data 604 in turn comprises a set of processor-executable computer instructions 606 that, when executed by a computing device 608 including a reader 610 for reading the processor-executable computer instructions 606 and a processor 612 for executing the processor-executable computer instructions 606, are configured to facilitate operations according to one or more of the principles set forth herein. In some embodiments, the processor-executable computer instructions 606, when executed, are configured to facilitate performance of a method 614, such as at least some of the aforementioned method(s). In some embodiments, the processor-executable computer instructions 606, when executed, are configured to facilitate implementation of a system, such as at least some of the one or more aforementioned system(s). Many such computer-readable media may be devised by those of ordinary skill in the art that are configured to operate in accordance with the techniques presented herein.

The term "computer readable media" may include communication media. Communication media typically embodies computer readable instructions or other data in a "modulated data signal" such as a carrier wafer or other transport mechanism and includes any information delivery media. The term "modulated data signal" may include a signal that has one or more of its characteristics set or changed in such a manner as to encode information in the signal.

According to some embodiments, a method for controlling a motor comprises applying a first reference torque generating current parameter during a start-up mode to a motor in a stationary state, generating a demand torque generating voltage parameter based on the first reference torque generating current parameter, determining a feedback torque generating current parameter based on measured motor current in the stationary state, determining a phase resistance measurement of the motor based on the demand torque generating voltage parameter and the feedback torque generating current parameter, and controlling the motor in a speed control mode based on the phase resistance measurement.

According to some embodiments, applying the first reference torque generating current parameter to the motor comprises setting an electrical angle position setpoint of the motor to 90 degrees, and applying the first reference torque generating current parameter to the motor to move the motor to the electrical angle position setpoint.

According to some embodiments, determining the phase resistance measurement comprises dividing the demand torque generating voltage parameter by the feedback torque generating current parameter.

According to some embodiments, generating the demand torque generating voltage parameter based on the first reference torque generating current parameter comprises generating the demand torque generating voltage parameter in a controller, and controlling the motor comprises configuring a gain parameter of the controller based on the phase resistance measurement.

According to some embodiments, controlling the motor comprises configuring a gain parameter of a controller based on the phase resistance measurement, and generating a drive signal for the motor in the speed control mode using the controller configured with the gain parameter.

According to some embodiments, controlling the motor comprises estimating a motor speed and a motor position based on the phase resistance measurement, and generating a drive signal for the motor in the speed control mode based on the motor position and the motor speed.

According to some embodiments, the method comprises iterating the generating of the phase resistance measurement in the stationary state.

According to some embodiments, determining the phase resistance measurement comprises generating a filtered value of the demand torque generating voltage parameter, converting the filtered value of the demand torque generating voltage parameter to an analog demand torque generating voltage parameter, generating a filtered value of the feedback torque generating current parameter, converting the filtered value of the feedback torque generating current parameter to an analog feedback torque generating current parameter, and determining the phase resistance measurement based on the analog demand torque generating voltage parameter and the analog feedback torque generating current parameter.

According to some embodiments, a motor controller comprises a first controller configured to apply, in a start-up mode, a first reference torque generating current parameter to a motor in a stationary state, a second controller configured to generate a demand torque generating voltage parameter based on the first reference torque generating current parameter during the start-up mode, and a feedback unit configured to receive a three-phase motor current measurement responsive to the demand torque generating voltage parameter and transform the three-phase motor current measurement to determine a feedback torque generating current parameter, wherein the first controller is configured to determine a phase resistance measurement of the motor based on the demand torque generating voltage parameter and the feedback torque generating current parameter, and the second controller is configured to control the motor in a speed control mode based on the phase resistance measurement.

According to some embodiments, the first controller is configured to set an electrical angle position setpoint of the motor to 90 degrees, and apply the first reference torque generating current parameter to the motor to move the motor to the electrical angle position setpoint.

According to some embodiments, the first controller is configured to determine the phase resistance measurement by dividing the demand torque generating voltage parameter by the feedback torque generating current parameter.

According to some embodiments, the second controller is configured to employ a gain parameter configured based on the phase resistance measurement in the speed control mode.

According to some embodiments, the motor controller comprises a third controller configured to generate a demand flux generating voltage parameter for driving the motor based on a reference flux generating current parameter using a gain parameter configured based on the phase resistance measurement.

According to some embodiments, the motor controller comprises an estimator unit configured to estimate a motor speed and a motor position in the speed control mode based on the phase resistance measurement, and a third controller configured to generate a second reference torque generating current parameter for the second controller in the speed control mode based on the motor position and the motor speed.

According to some embodiments, the first controller is configured to iterate the generating of the phase resistance measurement in the start-up mode.

According to some embodiments, the motor controller comprises a first low pass filter configured to generate a filtered value of the demand torque generating voltage parameter, and a second low pass filter configured to generate a filtered value of the feedback torque generating current parameter, wherein the first controller is configured to convert the filtered value of the demand torque generating voltage parameter to an analog demand torque generating voltage parameter, convert the filtered value of the feedback torque generating current parameter to an analog feedback torque generating current parameter, and determine the phase resistance measurement based on the analog demand torque generating voltage parameter and the analog feedback torque generating current parameter.

According to some embodiments, a system comprises a motor, a current sense unit connected to the motor and configured to measure a motor current and generate a motor current measurement, and a motor controller, comprising a first controller configured to apply, in a start-up mode, a first reference torque generating current parameter to the motor, a second controller configured to generate a demand torque generating voltage parameter based on the first reference torque generating current parameter during the start-up mode, and a feedback unit configured to receive the motor current measurement responsive to the demand torque generating voltage parameter and transform the motor current measurement to generate a feedback torque generating current parameter, wherein the motor is stationary during the start-up mode, the first controller is configured to determine a phase resistance measurement of the motor based on the demand torque generating voltage parameter and the feedback torque generating current parameter, and the second controller is configured to control the motor in a speed control mode based on the phase resistance measurement.

According to some embodiments, the second controller is configured to employ a gain parameter configured based on the phase resistance measurement in the speed control mode.

According to some embodiments, the system comprises a third controller configured to generate a demand flux generating voltage parameter for driving the motor based on a reference flux generating current parameter using a gain parameter configured based on the phase resistance measurement.

According to some embodiments, the system comprises an estimator unit configured to estimate a motor speed and a motor position in the speed control mode based on the phase resistance measurement, and a third controller configured to generate a second reference torque generating current parameter for the second controller in the speed control mode based on the motor position and the motor speed.

According to some embodiments, a system for controlling a motor comprises means for applying a first reference torque generating current parameter during a start-up mode to a motor in a stationary state, means for generating a demand torque generating voltage parameter based on the first reference torque generating current parameter, means for determining a feedback torque generating current parameter based on measured motor current in the stationary state, means for determining a phase resistance measurement of the motor based on the demand torque generating voltage parameter and the feedback torque generating current parameter, and means for controlling the motor in a speed control mode based on the phase resistance measurement.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application and the appended claims are generally to be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising".

Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for controlling a motor comprising:

applying a first reference torque generating current parameter during a start-up mode to a motor in a stationary state;

generating a demand torque generating voltage parameter based on the first reference torque generating current parameter;

determining a feedback torque generating current parameter based on measured motor current in the stationary state;

determining a phase resistance measurement of the motor based on the demand torque generating voltage parameter and the feedback torque generating current parameter;

configuring a gain parameter of a controller based on the phase resistance measurement;

generating a drive signal for the motor in the speed control mode using the controller configured with the gain parameter; and controlling the motor in a speed control mode based on the phase resistance measurement.

2. The method of claim 1, wherein applying the first reference torque generating current parameter to the motor comprises:

setting an electrical angle position setpoint of the motor to 90 degrees; and applying the first reference torque generating current parameter to the motor to move the motor to the electrical angle position setpoint.

3. The method of claim 1, wherein determining the phase resistance measurement comprises:

dividing the demand torque generating voltage parameter by the feedback torque generating current parameter.

4. The method of claim 1, wherein:

generating the demand torque generating voltage parameter based on the first reference torque generating current parameter comprises:

generating the demand torque generating voltage parameter in a controller.

5. The method of claim 1, comprising:

iterating the generating of the phase resistance measurement in the stationary state.

6. The method of claim 1, wherein determining the phase resistance measurement comprises:

generating a filtered value of the demand torque generating voltage parameter;

converting the filtered value of the demand torque generating voltage parameter to an analog demand torque generating voltage parameter;

generating a filtered value of the feedback torque generating current parameter;

converting the filtered value of the feedback torque generating current parameter to an analog feedback torque generating current parameter; and determining the phase resistance measurement based on the analog demand torque generating voltage parameter and the analog feedback torque generating current parameter.

7. A motor controller comprising:

a first controller configured to apply, in a start-up mode, a first reference torque generating current parameter to a motor in a stationary state;

a second controller configured to generate a demand torque generating voltage parameter based on the first reference torque generating current parameter during the start-up mode; and a feedback unit configured to receive a three-phase motor current measurement responsive to the demand torque generating voltage parameter and transform the three-phase motor current measurement to determine a feedback torque generating current parameter, wherein:

the first controller is configured to determine a phase resistance measurement of the motor based on the demand torque generating voltage parameter and the feedback torque generating current parameter; and the second controller is configured to control the motor in a speed control mode based on the phase resistance measurement, the second controller configured to employ a gain parameter configured based on the phase resistance measurement in the speed control mode.

8. The motor controller of claim 7, wherein:

the first controller is configured to:

set an electrical angle position setpoint of the motor to 90 degrees; and apply the first reference torque generating current parameter to the motor to move the motor to the electrical angle position setpoint.

9. The motor controller of claim 7, wherein:

the first controller is configured to determine the phase resistance measurement by dividing the demand torque generating voltage parameter by the feedback torque generating current parameter.

10. The motor controller of claim 7, comprising:

a third controller configured to generate a demand flux generating voltage parameter for driving the motor based on a reference flux generating current parameter using a gain parameter configured based on the phase resistance measurement.

11. The motor controller of claim 7, comprising:

an estimator unit configured to estimate a motor speed and a motor position in the speed control mode based on the phase resistance measurement; and a third controller configured to generate a second reference torque generating current parameter for the second controller in the speed control mode based on the motor position and the motor speed.

12. The motor controller of claim 7, wherein:

the first controller is configured to iterate the generating of the phase resistance measurement in the start-up mode.

13. The motor controller of claim 7, comprising:

a first low pass filter configured to generate a filtered value of the demand torque generating voltage parameter; and a second low pass filter configured to generate a filtered value of the feedback torque generating current parameter, wherein:

the first controller is configured to:

convert the filtered value of the demand torque generating voltage parameter to an analog demand torque generating voltage parameter;

convert the filtered value of the feedback torque generating current parameter to an analog feedback torque generating current parameter; and determine the phase resistance measurement based on the analog demand torque generating voltage parameter and the analog feedback torque generating current parameter.

14. A system, comprising:

a motor;

a current sense unit connected to the motor and configured to measure a motor current and generate a motor current measurement; and a motor controller, comprising:

a first controller configured to apply, in a start-up mode, a first reference torque generating current parameter to the motor;

a second controller configured to generate a demand torque generating voltage parameter based on the first reference torque generating current parameter during the start-up mode; and a feedback unit configured to receive the motor current measurement responsive to the demand torque generating voltage parameter and transform the motor current measurement to generate a feedback torque generating current parameter, wherein:

the motor is stationary during the start-up mode;

the first controller is configured to determine a phase resistance measurement of the motor based on the demand torque generating voltage parameter and the feedback torque generating current parameter; and the second controller is configured to control the motor in a speed control mode based on the phase resistance measurement, the second controller configured to employ a gain parameter configured based on the phase resistance measurement in the speed control mode.

15. The system of claim 14, comprising:

a third controller configured to generate a demand flux generating voltage parameter for driving the motor based on a reference flux generating current parameter using a gain parameter configured based on the phase resistance measurement.

16. The system of claim 14, comprising:

an estimator unit configured to estimate a motor speed and a motor position in the speed control mode based on the phase resistance measurement; and a third controller configured to generate a second reference torque generating current parameter for the second controller in the speed control mode based on the motor position and the motor speed.

* * * * *